(12) United States Patent
Meduri et al.

(10) Patent No.: US 11,457,080 B1
(45) Date of Patent: Sep. 27, 2022

(54) SERVICE MESH MANAGEMENT

(71) Applicant: Amazon Technologies, Inc., Seattle, WA (US)

(72) Inventors: Kiran Kumar Meduri, Bothell, WA (US); David Stephen Bell, Seattle, WA (US); Scott Howard La Vigne, Seattle, WA (US); Shubha Shree Bheemarao, Seattle, WA (US); Ivan Vitjuk, Seattle, WA (US); Karan Kumar Vasnani, Seattle, WA (US); James Joseph Straub, Seattle, WA (US); Yathish Sudhakara Gangolli, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/199,112

(22) Filed: Nov. 23, 2018

(51) Int. Cl.
*H04L 67/51* (2022.01)
*H04L 67/104* (2022.01)
*H04L 45/586* (2022.01)
*G06F 9/50* (2006.01)
*H04L 67/1074* (2022.01)
*H04L 67/56* (2022.01)
*H04L 67/60* (2022.01)

(52) U.S. Cl.
CPC ............ *H04L 67/51* (2022.05); *G06F 9/5072* (2013.01); *H04L 45/586* (2013.01); *H04L 67/1048* (2013.01); *H04L 67/1055* (2013.01); *H04L 67/1078* (2013.01); *H04L 67/56* (2022.05); *H04L 67/60* (2022.05)

(58) Field of Classification Search
CPC ... H04L 67/16; H04L 45/586; H04L 67/1048; H04L 67/1055; H04L 67/1078; G06F 9/5072
See application file for complete search history.

(56) References Cited

U.S. PATENT DOCUMENTS

| 6,003,084 | A | * | 12/1999 | Green | H04L 29/06 709/203 |
|---|---|---|---|---|---|
| 6,332,163 | B1 | * | 12/2001 | Bowman-Amuah | H04L 12/4604 709/217 |
| 9,807,621 | B1 | * | 10/2017 | Hui | H04B 17/382 |
| 10,200,842 | B1 | * | 2/2019 | Roy | H04L 67/12 |
| 2001/0054095 | A1 | * | 12/2001 | Kampe | G06F 11/202 709/223 |
| 2004/0128546 | A1 | * | 7/2004 | Blakley, III | G06F 21/6245 726/8 |

(Continued)

*Primary Examiner* — William G Trost, IV
*Assistant Examiner* — Monishwar Mohan
(74) *Attorney, Agent, or Firm* — Davis Wright Tremaine LLP

(57) ABSTRACT

A system, method, and computer readable medium for managing service mesh for container instances. The method includes generating a service mesh that includes a plurality of computing resources. The method further includes obtaining, from an instantiated computing resource, a request to associate the computing resource with another computing resource in the service mesh, where the request comprising a set of constraints that allows the other computing resource to be identified. Based on the set of constraints, the computing resources in the service mesh are connected in which the computing resources communicate with each other through a dedicated proxy.

20 Claims, 9 Drawing Sheets

(56) References Cited

U.S. PATENT DOCUMENTS

| | | | | |
|---|---|---|---|---|
| 2007/0189279 A1* | 8/2007 | Thalanany | ............... | H04L 63/10 370/356 |
| 2009/0138713 A1* | 5/2009 | Veillette | ................. | G01D 4/004 713/171 |
| 2009/0228542 A1* | 9/2009 | Meijer | ..................... | G06F 9/505 709/201 |
| 2011/0029659 A1* | 2/2011 | Shah | ........................ | H04L 12/12 709/224 |
| 2012/0170654 A1* | 7/2012 | Zhang | .................... | H04N 19/58 375/240.16 |
| 2012/0233464 A1* | 9/2012 | Miller | ................ | G06Q 30/0601 713/168 |
| 2012/0309417 A1* | 12/2012 | Blom | ........................ | H04L 51/20 455/456.1 |
| 2013/0103837 A1* | 4/2013 | Krueger | ................ | G06F 9/5072 709/226 |
| 2013/0166703 A1* | 6/2013 | Hammer | ................. | H04L 63/10 709/220 |
| 2013/0170363 A1* | 7/2013 | Millington | .......... | H04L 65/1069 370/252 |
| 2013/0250783 A1* | 9/2013 | Ericson | ................ | H04W 60/005 370/331 |
| 2014/0185688 A1* | 7/2014 | Kimura | ................ | H04N 19/197 375/240.18 |
| 2014/0267565 A1* | 9/2014 | Nakafuji | ................ | H04L 65/403 348/14.08 |
| 2015/0244616 A1* | 8/2015 | Nguyen | .................. | H04L 45/70 709/242 |
| 2015/0324215 A1* | 11/2015 | Borthakur | ............. | G06F 9/5083 718/1 |
| 2016/0066249 A1* | 3/2016 | Dukes | ................. | H04W 40/246 370/255 |
| 2016/0191357 A1* | 6/2016 | Omer | ..................... | H04W 24/02 370/328 |
| 2016/0205518 A1* | 7/2016 | Patel | .................... | H04L 65/1073 455/518 |
| 2016/0301751 A1* | 10/2016 | Peelen | .................. | H04L 67/104 |
| 2016/0373291 A1* | 12/2016 | Dornemann | ............ | H04L 67/28 |
| 2017/0163724 A1* | 6/2017 | Puri | ...................... | G06F 9/5083 |
| 2017/0195444 A1* | 7/2017 | Allen | ...................... | H04L 67/28 |
| 2017/0237757 A1* | 8/2017 | Holloway | ........... | H04L 63/0281 726/22 |
| 2017/0264639 A1* | 9/2017 | Sama | ..................... | H04L 63/029 |
| 2017/0279805 A1* | 9/2017 | Diaz-Cuellar | ...... | H04L 63/0807 |
| 2018/0063714 A1* | 3/2018 | Stephenson | ........... | H04W 8/005 |
| 2018/0132285 A1* | 5/2018 | Jackson | ................. | B60Q 1/525 |
| 2018/0212866 A1* | 7/2018 | Kumar | ................... | H04L 45/22 |
| 2018/0234302 A1* | 8/2018 | James | ..................... | G06N 20/00 |
| 2018/0352259 A1* | 12/2018 | Guo | ........................ | H04N 19/91 |
| 2019/0102280 A1* | 4/2019 | Caldato | .................. | H04L 67/10 |
| 2019/0190802 A1* | 6/2019 | Jalali | ..................... | H04L 41/12 |
| 2019/0266502 A1* | 8/2019 | Moser | ....................... | G06N 5/04 |
| 2019/0273746 A1* | 9/2019 | Coffing | .................. | H04L 63/20 |
| 2019/0347406 A1* | 11/2019 | Lev-Ran | ................. | G06F 21/51 |
| 2019/0349421 A1* | 11/2019 | Schincariol | ........... | G06F 9/5072 |
| 2019/0356693 A1* | 11/2019 | Cahana | ................ | H04L 63/0281 |
| 2020/0162380 A1* | 5/2020 | Pilkington | .......... | H04L 47/2433 |
| 2020/0351332 A1* | 11/2020 | Palladino | ................ | H04L 67/10 |
| 2021/0084109 A1* | 3/2021 | Gimenez Palop | .. | H04L 65/4084 |

* cited by examiner

SERVICE MESH MANAGEMENT

BACKGROUND

Customers seeking to host and execute applications and web services often utilize networks of computers and storage resources provided by computing resource service providers. To determine a more efficient use of the computing resources, customers develop applications as a collection of one or more minimal functional services, also known as microservices, that are deployed separately but can interact together to function as a broader application. Each microservice can be built, changed, and deployed quickly with a relatively small impact, empowering developers to increase the deployment rate of the applications. As more microservices are adopted by customers to build applications, however, it becomes increasingly difficult to quickly identify and debug issues in any part of an application because each microservice is typically deployed to function independently from others. Furthermore, it can be challenging to build additional logic to provide mechanisms that monitor, control or debug one or more microservices of an application.

BRIEF DESCRIPTION OF THE DRAWINGS

Various techniques will be described with reference to the drawings, in which.

DETAILED DESCRIPTION

Figure 1:
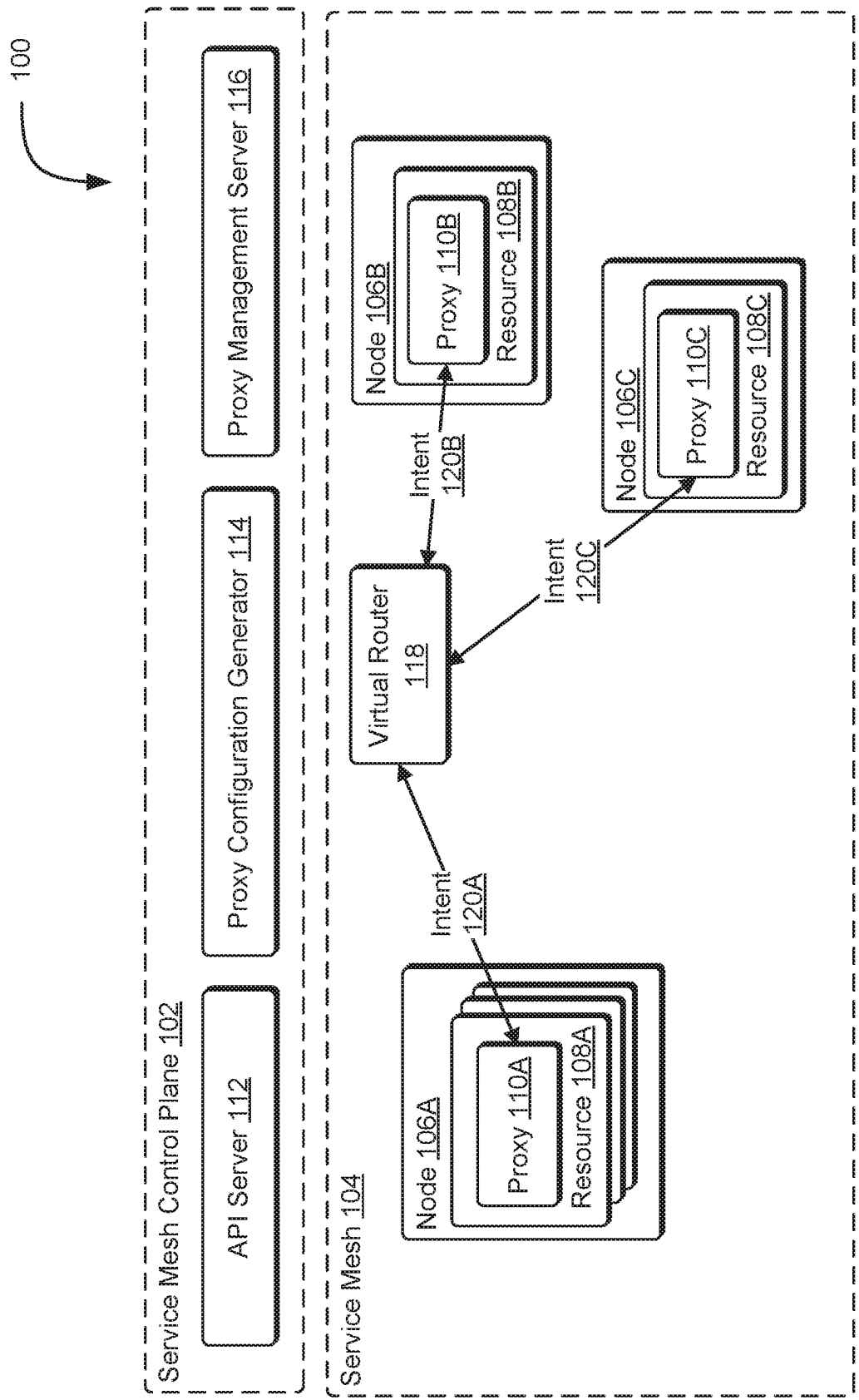
FIG. 1 shows an illustrative example of an environment of a service mesh in which microservices communicate in accordance with at least one embodiment.

This disclosure relates to implementing and managing a service mesh that connects microservices (or referred hereinafter as "nodes") used to build one or more applications and allows the microservices to communicate with each other. A service mesh provides a logical boundary within which nodes can be registered and connections between them can be configured. For example, distributed applications including one or more nodes may form a service mesh, in which a node (e.g., data storage service) may be configured to communicate with another node (e.g., authentication service), but not with remaining nodes. In another example, nodes in a virtual private network may form a service mesh. The service mesh may involve providing several communication configurations into a dedicated proxy for each node. These proxies may be configured to run alongside each node and handles all inbound/outbound network traffic to a set of resources that execute the functions for the node. In addition, the service mesh may utilize the data provided by the service mesh proxy and provide such data to other services of a computing resource service provider that allows viewing and management of communication between services including inter-service metrics, traffic routing, load balancing, etc. Therefore, the service mesh can be configured to collect the traffic data transmitted by proxies of the nodes to enable enhanced visibility into an application by leveraging the collected data to obtain metrics like latencies, error rates, error codes, service communication traces, and service-level logs on client and server-side. The service mesh may further allow third party computing resource service to provide traffic controls that enable retries, timeouts, circuit-breaking, server-side rate-limiting, and quotas for the nodes in the service mesh. The management of the nodes can be performed in an availability zone-aware, a latency-aware, or in a weighted manner, allowing the developer of the application to quickly test and deploy new versions of microservices. In additional aspects of the present disclosure, the service mesh can be configured to provide security capabilities like TLS termination, authentication, authorization, API management, and auditing for the nodes in the service mesh.

In accordance with the several aspects of the present disclosure, nodes in service meshes may be configured and managed through a service mesh control plane that communicates with proxies of the nodes. More specifically, mesh proxies include self-contained application images, which may be configured to communicate with the service mesh control plane, and each of these proxy images are provided to each node in the service mesh.

In aspects of the present disclosure, the service mesh can be configured to provide simple, service-centric abstractions to allow many computing resource services to monitor, control, and debug communication between services forming an application. In some aspects of the present disclosure, the service mesh may process all capabilities requested by microservices and coordinate with services provided by the computer resource service provider to simplify the processes involved in running microservices in such computing resources further. Because the microservices communicate through a self-contained dedicated proxy, each of the microservices can be created using different coding systems and libraries, which allow more flexibility and scalability for application developers. Furthermore, each node can be configured to have its own individual network configurations by communicating its network intent to the service mesh control plane. By individualizing the network configurations to each node, the aspects of the present disclosure enables increased security and reduced vulnerability from unauthorized access or attacks, including poison pill attacks that are intended to compromise all resources connected to the network. In additional aspects of the present disclosure, the service mesh control plane may manage various microservices deployed across different infrastructure services provided by a computer resource service provider.

Accordingly, aspects of the present disclosure may provide a single view and a single point of control for all the communications between microservices in their application, as well as isolating the network configurations to each microservice to improve scalability and security of the service mesh. Further, consistent metrics, logs, and traces and gives end-to-end visibility across microservices can be provided, allowing customers to quickly identify and debug issues that may occur in one or more microservices. The service mesh can be configured to provide traffic routing controls to manage communications between microservices, making it fast and safe to test and deploy new versions of microservices without causing downtime for the application. Because the service mesh of the entire application allows each deployed microservice to communicate with each other, writing custom code into each microservice or implementing programming language specific libraries within each microservice is no longer required. In additional aspects of the present disclosure, the service mesh may provide application programming interfaces (hereinafter referred to as "APIs"), which remove the need for customers to run their own infrastructure.

As one skilled in the art will appreciate in light of this disclosure, certain embodiments may be capable of achieving certain advantages, including increased efficiency of using computing resources that support the application and improving the ability to debug and isolate failures that may occur in one or more components of an application. By enabling communication between the microservices of an application while allowing these microservices to be built and deployed independently, there is a significant improvement in software development technology by enabling rapid development and deployment of applications through use of microservices while reducing the complexities that occur with deployment of the microservices. Furthermore, the service mesh may obtain traffic metrics and route network traffic by using service mesh proxies, which can be leveraged to improve resiliency, availability, and scalability of microservices that support an application.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment of a service mesh in which microservices communicate in accordance with at least one embodiment. In several embodiments, the service mesh includes nodes in which each node may be associated with one or more other nodes through a dependency relationship. The environment 100 includes a service mesh control plane 102 that establish associations between nodes 106A-C in a service mesh 104 that perform various services (e.g., authentication service, data storage service) for one or more applications.

In several embodiments, the computing resources 108A-C may be executed together as part of a cluster provided by a computing resource service provider. The computing resource service provider may provide one or more computing resource services to its customers individually or as a combination of services of a distributed computer system. The one or more computing resource services of the computing resource service provider may be accessible over the network and may include services such as an event applier service, a computing resource monitoring service, virtual computer system services, block-level data storage services, cryptography services, on-demand data storage services, notification services, authentication services, policy management services, task services and/or other such services. Not all embodiments described include all of the services described and additional services may be provided in addition to, or as an alternative to, services explicitly described.

In some embodiments, each cluster, such as cluster, may include a cluster identifier (ID) that uniquely distinguishes the clusters from each other. Clusters may be specified by referring to their respective cluster identifier. A customer may use different clusters for different types of tasks. For example, a customer may use a first cluster for launch services and may use a second cluster for executing batch jobs. The instances in the first cluster may have been optimized for running a server, and the instances of the second server may have been optimized for submitting short-lived transient jobs, like batch jobs.

In several embodiments, one or more computing system instances may be computer system instances (virtual or non-virtual, such as a physical computer system running an operating system) that are configured to launch and run software computing resources 108A-C. Thus, the computing system may be configured to run the computing resources 108A-C in accordance with a definition file provided by the customer. As referred herein above, one or more computing system instances may comprise a cluster. In some examples, cluster may refer to set of one or more computer system instances that have been registered to (i.e., as being associated with) the cluster. Thus, the computing system instance may be one of many different container instances registered to the cluster, and the other container instances of the cluster may be configured to run the same or different types of computing resources. The computing system instances within the cluster may be of different instance types or of the same instance type, and the customer may have more than one cluster. Thus, the customer may launch one or more clusters and then manage user and application isolation of the computer resources within each cluster through application programming interface calls. In other embodiments, a computer system instances may operate without being associated with a cluster. For example, the computer system instances may provide computing resource 108B to support node 106B.

In several embodiments, computing resources 108A-C may include containers (also referred to as a software container or isolated user space instance) may be one or more virtualization instances running under a computer system instance that includes programs, data, and system libraries. When one of the containers is run, the running program (i.e., the process or set of processes) is isolated from other processes running in the same computer system instance. Thus, the containers may each run on an operating system (e.g., using memory, CPU, and storage allocated by the operating system) an operating system of the computer system instance and execute in isolation from each other (e.g., each container may have in isolated view of the file system of the operating system). Each of the containers may have its own namespace, and applications running within the containers are isolated by only having access to resources available within the container namespace. Thus, containers may be an effective way to run one or more single applications within their own namespace. A container encapsulation system allows one or more containers to run within a single operating instance without overhead associated with starting and maintaining virtual machines for running separate user space instances. An example container encapsulation system is the Docker container engine.

In several embodiments, each of computer system instances may include one or more tasks running in a within the cluster. In some examples, one of nodes 106A-C may include a process being executed within one or more computer system instances, and corresponding "node definition" may define how computing resources should be launched to execute the process specified by such node. In some embodiments, node definition may be a file specifying a set of linked computing resources (e.g., a set of software containers that, when running on a host computing system, are associated with each other) that are assigned to start as a group. The node definition may be written in various formats, such as JavaScript Object Notation (JSON) or Extensible Markup Language (XML). The node definition may specify: locations of software images for the set of nodes, amount of memory and/or amount of processing power to be allocated from the host to the specified software containers, disk, network locations, and other resources that the software containers should share with each other, how a set of software containers should be associated with each other, and/or information for scheduling the set of nodes. The node definition may be stored in a node definition file.

In several embodiments, computing resources 108A-C can be instantiated within container instances through node definitions. The node definition file may further specify disk and network locations that the computing resources 108A-C are able to share on one or more physical machines. The node definition file may be utilized for launching the set of computing resources 108A-C. In some implementations, the node definition file may define and link computing resources 108A-C spread across multiple physical machines. One node definition file may contain and schedule many nodes, including nodes 106A-C. In some examples, task may refer to an instantiation of a node definition file, and may consist of one or more computing resources 108A-C. Node 106A-C may be modified by applying a new node definition to the node 106A-C. The node definition file may contain all the information needed to place computing resources 108A-C in a cluster, which may be managed through application programming interface calls.

The computing resources 108A-C may be launched to have only specified resources from resources allocated to the computer system instance; that is, a computing resource 108A may be launched to have a certain amount of memory and to not utilize more than a specified amount of processing power. The resource allocation for the computing resources 108A-C may be specified in a node definition file. Multiple computing resources 108A-C may run simultaneously on a single host computer or host system instance, and the resources of the host can be allocated efficiently between the computing resources. In some embodiments, a host may support running computing resources in computer system instances from only one customer. In other embodiments, a single host may allow multiple customers to have computer system instances running on the host. In the latter case, the computer resource management service may provide security to ensure that the customers are unable to access computer resources, clusters, or computer system instances of the others.

In several embodiments, each of nodes 106A-C may refer to any process that is configured to provide computing functions, data functions, and/or end services to applications and devices via data transmitted between the nodes 106A-C. For example, nodes 106A-C may include, but are not limited to, one or more software containers, applicant components, and/or microservices configured to implement the process executed by the nodes 106A-C. In addition, nodes 106A-C may include corresponding proxies 110A-C and may further include a defined interface that allows applications, devices, and other services to communicate with the nodes 106A-C in the service mesh 104. In one example, service requests from the customer to the nodes 106A-C may be made using one or more application programming interface (API) calls. An API may be defined for nodes 106A-C as a set of resources and methods that are available to applications, devices, and other services via the API. For example, an application or device may request the nodes 106A-C perform a method via the API. The nodes 106A-C may be scaled according to an API request load for the other nodes in the service mesh 104. For example, nodes 106A-C may include one or more computer system instances executing the nodes 106A-C, or a software container executing an instance of nodes 106A-C that may be scaled up or down according to the service's API request load.

In some embodiments, nodes 106A-C are compute functions that are hosted by a function execution service. In several embodiments, a compute function is code that is uploaded to the function execution service and associated with one or more triggers to execute the function. For example, a trigger could be a request to the function execution service to run the function or the trigger could be set on an event generated by the function execution service or another service. The nodes 106A-C thus may perform various tasks and communicate with other nodes of the service mesh 106A-C in accordance with the triggers associated with them.

The nodes 106A-C may be configured to interact with each other by utilizing intents 120A-C. In several embodiments, an "intent" may be any data structure that specifies a set of constraints, in which the nodes 106A-C, via the intents 120A-C, may indicate how the communication between the nodes 106A-C should be handled. For example, to establish and manage connections within the service mesh 104, a node 106A may submit an intent 120A to the service mesh control plane 102 to indicate that the node 106A should be connected to a second node 106B. At the same time, the node 106A may also indicate other types of connection constraints in the intent 120A, such as limiting connections to certain ports and protocols, prohibiting connections with other nodes (e.g., node 106C), and maximum number of connections allowed to be connected to node 106A. For illustrative purposes, an intent may include the following data schema:

{
  "timestamp": current time,
  "name": "node 106A",
  "backends": ["example.com", "blank.org"],
  "listeners":{
    "port":80,
    "protocol":HTTP
  "health_status":"good",
  "maximum connections":5
}

In several embodiments, intents 120A-C can be associated with one or more connection policies. Connection policies can specify one or more properties required and/or preferred for a requested connection by nodes 106A-C. For example, the intents 120A-C can specify in a connection policy that it requires a connection with a certain amount of throughput (e.g., high throughput, low throughput). In another example, the intents 120A-C can specify in one or more connection policies that it desires particular network paths. Other examples of intents 120A-C include (but are not limited to) authorized nodes that can be connected, latency (e.g., direct connection to an endpoint/server or connection via proxy, fast or slow, etc.), semantics (e.g., request/response semantics or advanced semantics, etc.), type (e.g., multi-tenant characteristics) of connection (e.g., preexisting connection is allowed or must be new connection, etc.), throughput, cost, and priority (e.g., high, normal, low, etc.). In several embodiments, intents 120A-C may provide policies in a manner that can be inferred by the service mesh control plane 102 to determine the above listed connection policies.

In several embodiments, node definitions can be specified to configure one or more proxies 110 (also referred herein as "mesh proxies" or "sidecar proxies") to run within each of the corresponding computing resources 108A-C. The proxies 110 may act in the networking layer of a customer's infrastructure and run alongside computing resources 108A-C, may handle all service requests from the computing resources 108A-C passing through them, and often provides new visibility, traffic control and security capabilities for the service mesh 104. In one embodiment, the proxies 110 may obtain routing configuration information from the service mesh control plane 102, which allow the nodes 106A-C to communicate with each other through the proxies 110. In another embodiment, the proxies 110 may collect network traffic data generated based on execution of the computing resources 108A-C and provides such data to the service mesh control plane 102 for further processing such as discovery of nodes 106A-C that may fail due to an unforeseen event. Examples of proxies 110 may include, but are not limited to, Envoy, Linkerd and Conduit.

Proxies 110 may be accessible via public network addresses, such as IP addresses. For instance, each of the proxies 110 may be associated with a corresponding uniform resource locator (URL) that is different than a URL used for the corresponding backing service. For instance, in the example of a proxy and service being in different geographic jurisdictions, a proxy may have a URL in the form of service<dot>country1<dot>serviceprovider<dot>com while the backing service may have a URL of the form service<dot>country2<dot>serviceprovider<dot>com, where <dot> represents the character in the brackets used for delimiting domains and sub-domains. In other examples, the proxy and the service mesh may have the same URL but different public IP addresses. Distributed DNS servers may be configured to resolve the URL to an IP address for the proxy or backing service that is geographically closest. As yet another example of a variation considered as being within the scope of the present disclosure, a backing service may be configured to reroute requests through the proxy so that the backing service receives data in encrypted form, where appropriate. Other variations are also considered as being within the scope of the present disclosure.

In some embodiments, not all nodes 106A-C need to include proxies 110A-C. More specifically, the nodes that need to call the service mesh control plane 102 may include the proxy components, while other nodes of the service mesh 104 that receives calls from the service mesh control plane 102 may operate without any proxies. For example, node 106A needs its port and backend host names to be established within the service mesh, and accordingly configures its proxy 110A to submit the intent 120A in the service mesh 104. In other embodiments, any nodes without the proxies can later be configured to include the proxies to allow such nodes to submit calls to the nodes in the service mesh 104.

In several embodiments, the service mesh control plane 102 is a software layer in the service mesh environment 100 that handles all communication between nodes 106A-C and collects telemetry from the proxies 110. The service mesh control plane 102 may connect, manage and secure interactions between nodes 106A-C that are independent of application code since the computing resources 108A-C supporting these nodes 106A-C can be configured separately from applications. In some embodiments, service mesh control plane 102 may communicate with one or more proxies 110 deployed alongside each of nodes 106A-C. In other embodiments, the service mesh control plane 102 includes a proxy configuration generator 114, which takes configuration input from service owners and configures the proxies 110 associated with each service endpoint.

In some embodiments, service mesh control plane 102 may interact with one or more cryptography services to secure communications exchanged between nodes 106A-C. In addition, service mesh control plane 102 may provide a service interface to which the customer can submit requests. The service interface may be accessible at one or more public network addresses, such as one or more public IP addresses. The service mesh control plane 102 may thus utilize the cryptography service to ensure sure that any data transmitted in the service mesh 104 (e.g., routing, traffic) are cryptographically protected. In some embodiments, service mesh control plane 102 may interact with an authentication service, which may be a collection of computing resources such as described above that serve to enable the service mesh control plane 102 to determine whether to fulfill requests submitted by the customer or by another component of the environment.

In several embodiments, service mesh control plane 102 collects metrics from the nodes 106A-C via their corresponding proxies 110A-C, in which the collected metrics may include per service and inter-service latencies, error rates, and connections per second. Metrics and logs collected by service mesh control plane 102 may be automatically provided to one or more monitoring services of a computer resource service provider, to allow the customer to trace data transmitted among nodes 106A-C of an application. In other embodiments, service mesh control plane 102 may interact with services offered by third party service providers for monitoring, security, tracing, and debugging. In yet other embodiments, service mesh control plane 102 may enable traffic control of data flowing between nodes 106A-C, thereby allowing canary style deployments, retries, timeouts, and circuit breaking of the nodes 106A-C of an application.

In some embodiments, service mesh control plane 102 may operate the service mesh and its associated nodes 106A-C without additional control plane infrastructure. In other implementations, service mesh control plane 102 operates in conjunction with an application load balancer, in which the application load balancer also emits metrics collected by proxies 110 to a telemetry service, which the customer may use for configuring monitoring services of a computer resource service provider and/or trigger policies for scaling computer system resources. For example, the customer may configure, to scale scaling computer system resources, the alarm to trigger if a request rate from nodes 106A-C to the application load balancer is above a certain threshold.

In some embodiments, service mesh control plane 102 includes API server 112, proxy configuration generator 114, and proxy management server 116. API server 112, consoles, or software development kits may be provided by the service mesh control plane 102 to configure the service mesh 104, manage configurations of each node through data transmitted by its corresponding mesh proxy, and control traffic between the nodes 106A-C. Using the API server 112, service mesh control plane 102 may export service metrics, like latencies, error rates, error codes, service communication traces, and service-level logs to other services provided by computer resource service provider or any third-party monitoring and tracing tools that can integrate with the service mesh control plane 102. Using the API server 112, service mesh control plane 102 may collect data transmitted by proxies 110A-C to other computer resource services that provide customer traffic routing features of like retries, timeouts, circuit-breaking, server-side rate-limiting, and quotas of associated computer system instance in a consistent manner. For example, service mesh control plane 102 may route traffic between services in an availability zone-aware, a latency-aware, or in a weighted manner, which makes it easy to deploy new microservices.

In some embodiments, API server 112 may route traffic between applications deployed on computer system instance based on service versions, request attributes, and availability zones. API server 112 allows updating proxy configuration generator 114 to customize appropriate retries, timeouts and error-codes to manage connections to the servers that are discovered using service-discovery. In other implementations, traffic can also be shadowed to alternate servers for further troubleshooting. API server 112 may communicate with proxy configuration generator 114 to set access controls, quotas and limits on the upstream and downstream requests. These capabilities make it easier to deploy new versions of microservices and help tune applications to be resilient to communication failures.

In some embodiments, API server 112 may be coupled to a database, which may store routing data for the service mesh in determining where to route traffic between microservices. In these embodiments, the routes of messages can be updated by the customer or automatically proxy management server 116, in which service mesh control plane 102 determines how traffic and communication messages can be routed. Database may store other data on messages received from proxies 110A-C, to determine dependencies between the microservices of the service mesh, and at times identify any microservices that accepted or rejected the messages.

In several embodiments, service mesh control plane 102 includes a proxy management server 116, which directly communicates with proxies 110A-C corresponding to the node 106 nodes 106A-C. Through the proxies 110A-C, the proxy management server 116 may configure how the applications associated with the node 106 may communicate with each other. In other implementations, the proxy management server 116 may obtain data communicated from the proxies 110A-C and utilize the obtained data to monitor and manage network traffic associated with the node 106.

The proxy management server 116 may be responsible for creation, termination, and assignment of the proxies 110A-C. For example, the proxy management server 116 may configure a new proxies 110A-C for a newly created node 106, which would allow the new node 106 to communicate with one or more other containers in the data plane including clusters of computer system instance that support one or more microservices. Proxy management server 116 may assign and/or associate dependency relationship among nodes 106A-C so as to allow them to communicate with each other. For example, the proxy management server 116 may map a particular node 106 (e.g., node 106A) to another node (e.g., node 106B) supporting an authentication service to allow the customer to trace the interactions between the mapped nodes 106A-C. In another example, the proxy management server 116 may determine a number of nodes 106A-C in the service mesh 104 to interact with each other. Accordingly, dependency relationships can be determined by a proxy management server 116, which forwards routing information to the proxies 110A-C corresponding to the nodes 106A-C. Based on the routing information, the proxies 110A-C may register endpoint information of associated nodes 106A-C, and as a result, form a relationship between nodes 106A-C so that they may communicate with each other and share data for third party monitoring and debugging services. In some embodiments, customers may construct API calls to the API server 112 of the service mesh 104 to generate dependencies between the nodes 106A-C.

Service mesh control plane 102 may also include a proxy configuration generator 114, which generates a set of configuration settings that are communicated to the proxies 110A-C of the nodes 106A-C. In several implementations, the proxy configuration generator 114 provides timeout, traffic routes, circuit breaking, retries and other control settings between services associated with the service mesh control plane 102. As noted above, the proxy configuration generator 114, based at least in part on input from the API server 112, may set access controls, quotas and limits on the upstream and downstream requests.

In additional implementations, proxy configuration generator 114 may generate service mesh proxy bootstrap configuration files to enable the computer system instance to generate the nodes 106A-C that includes the proxies 110A-C. In this manner, bootstrap configuration file may be added to the process of loading both the node 106 and proxies 110A-C into the memory of a computer system instance during instantiation, to allow the operating system of the computer system instance to manage the configuration of the proxies 110A-C as well as loading other necessary binaries and libraries as needed.

In several embodiments, virtual router 118 may be provided in the service mesh 104 that stores the dependency relationships between the nodes 106A-C in the service mesh 104. In one embodiment, a routing table may be utilized by the virtual router 118, so that the nodes 106A-C may submit intents for network configuration. In some embodiments, the virtual router 118 may be managed by the proxy management server, which may change the dependency relationships between nodes 106A-C. When changes to dependency relationships are applied, the proxy management server communicates such changes to the service mesh proxies of the containers. Through this approach, the containers no longer need custom codes to form dependencies with other containers, as the service mesh control plane ensures that the dependency and network relationships between containers can be separately built and traced for better visibility to the customers.

Figure 2:
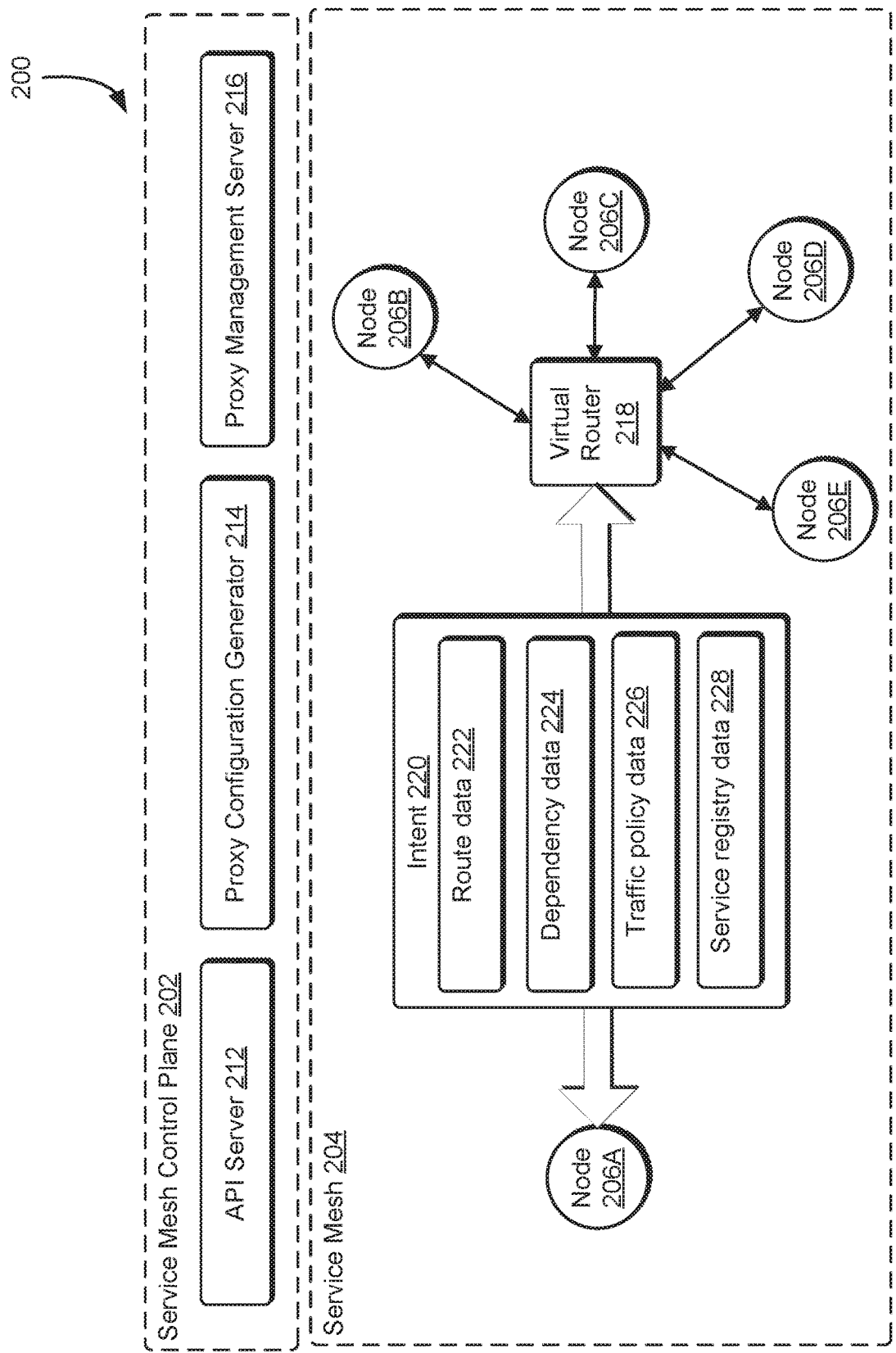
FIG. 2 shows an illustrative example of an architectural diagram of a service mesh in which a microservice provides connection requests to the virtual router in accordance with at least one embodiment.

FIG. 2 shows an illustrative example of an architectural diagram 200 of a service mesh 204 in which a microservice provides connection requests to the virtual router in accordance with at least one embodiment. Service mesh control plane 202 may be service mesh control plane 102 of FIG. 1 in accordance with an embodiment. Service mesh 204 may be service mesh 104 of FIG. 1 in accordance with an embodiment. Nodes 206A-E may be one of nodes 106A-C of FIG. 1 in accordance with an embodiment. Intent 220 may be one of intents 120A-C of FIG. 1 in accordance with an embodiment. API server 212 may be API server 112 of FIG. 1 in accordance with an embodiment. Proxy configuration generator 214 may be proxy configuration generator 114 of FIG. 1 in accordance with an embodiment. Proxy management server 216 may be proxy management server 116 of FIG. 1 in accordance with an embodiment. Virtual router 218 may be virtual router 118 of FIG. 1 in accordance with an embodiment.

A customer may generate intent 220 corresponding to the node 206A, in which intent 220 may specify a set of constraints that indicate how the communication transmitted from the nodes 206A-E should be handled. For example, intent 220 may include route data 222, which in turn includes information that indicates how the network traffic should be routed to the appropriate service mesh and its associated microservices. In some embodiments, route data 222 of intent 220 include type of internet protocol (e.g., HTTP) that can be used reach the target microservices as well as weights in each service mesh to allow requests to be routed within the policies specified in the route data 222. In other embodiments, retries and timeouts for the network traffic may be configured on route data 222 on per-route basis. An example application programming interface call for establishing route data 222 is provided as follows:

```
json = {
    "name": "string", # unique name, can be fqdn
    "mesh": "string", # mesh under which this service is registered
    "routes": [
        {
            "type": "string", # only http(default) is supported
            # See Route Match
            # Default is {"prefix":"/"} to match everything
            # Also note that order matters
            "httpMatch": {
                "prefix": "string",
                "path": "string",
                "regex": "string",
                # see HeaderMatcher
                "headers": [
                    {
                        "name": "string",
                        "exact_match": "string",
                        "regex_match": "string",
                        "range_match": "string",
                        "present_match": boolean,
                        "invert_match": boolean
                    }
                ],
                # see Query Parameter Matcher
                "queryParameters": [
                    {
                        "name": "string",
                        "value": "string",
                        "regex": boolean
                    }
                ]
            },
            # See Route Action (weighted clusters)
            "targets": [
                {
                    "subset": "string", # subset name from service registered above
                    "weight": number # total across targets should be 100
                }
            ],
            # See Retry Policy
            "retryPolicy": {
                "retryOn": "string", # error codes
                "numRetries": number,
                "perTryTimeout": "duration"
            },
            # See Route Action (timeout)
            "timeout": "duration",
            # see GZip support
            "compression": {
                "enableGzip": boolean,
                "contentLength": number
            },
            # see Request Mirroring
            "mirror": {
                # Name of service where traffic will be mirrored
                "destination": "string"
            }
        }
    ]
}
```

In one embodiment, intent 220 may also include dependency data 224, which in turn includes information that specifies how the node 206A may be associated with other nodes 206B-E based on the schema specified by dependency data 224. In several implementations, dependency data 224 is used by service mesh control plane 202 to connect services based on the corresponding proxies (e.g., proxy 110 of FIG. 1). In one embodiment, dependency data 224 identifies the relationship between nodes based on key-value pairs. An example application programming interface call for establishing dependency data 224 is provided as follows:

```
json={
    "name": "string", # unique name, can be fqdn
    "mesh": "string", # mesh under which this service is registered
    "dependencies": [
        {
            "name": "string" # name of service that this service will make calls to
        }
    ]
}
$ service mesh put-dependencies --cli-input-j son "${json}"
```

In an additional embodiment, intent 220 may include traffic policy data 226, which in turn includes information that defines one or more policies on how network traffic passing through the node 206A should be handled. In some embodiments, traffic policy data 226 specifies a number of health checks that need to pass in order to maintain the connection with node 206A. An example application programming interface call for establishing traffic policy data 226 is provided as follows:

```
json={
    "name": "string", # unique name, can be fqdn
    "mesh": "string", # mesh under which this service is registered
    "trafficPolicies": {
        # loadBalancer is one of [least_request, ring hash, random, round_robin]
        # see Load Balancing.
        "loadBalancer": "string",
        # see Health Checking
        "healthCheck": {
            "timeout": "duration",
            "interval": "duration",
            "unhealthyThreshold": number,
            "healthyThreshold": number,
            "protocol": "string",
            "path": "string",
            "port": number
        },
        # see Outlier Detection for more details
        "outlierDetection": {
            "consecutive5xx": number,
            "interval": "duration"
```

},
see Circuit Breaker
"circuitBreaker": {
    "maxConnections": number,
    "maxPendingRequests": number,
    "maxRequests": number,
    "maxRetries": number
}
}
}
}
$ service mesh put-traffic-policies --cli-input-json "${json}"

In an additional embodiment, intent 220 may include service registry data 228, which in turn includes information that enables discovery of the information about the microservice represented by the node 206A. In several implementations, the service mesh control plane 202 may obtain the endpoint information of the node 206A (and any associated computer system instances) based on the service registry data 228. In some embodiments, service registry data 228 may define subsets of other computing resources, in which these subsets can be used to configure the node 206A at a finer granularity with regards to routing, policies, etc. In one embodiment, service registry data 228 also defines one or more ports that connects the containers to the service mesh. An example application programming interface call for establishing service registry data 228 is provided as follows:

```
json = {
    "name": "string", # unique name
    "mesh": "string", # mesh under which this service is registered
    "subsets": {
        # key is name that will be used to refer this subset when
        # defining routes and policies
        "string": {
            "type": "string",
            "selector": {
                # key-value string map
                # e.g. "cluster":"bookstore"
                "string": "string",
                # e.g. "service": "products" or "taskDefFamily":"products"
                "string": "string",
                "string": "string"
            }
        }
    },
    "ports": [
        {
            # protocol is one of HTTP|HTTPS|GRPC|HTTP2|TCP
            "protocol": "string",
            "port": number
        }
    ],
    # domains under which this service is reachable. mostly this
    will be of size 1.
    "domains": ["string"],
    "serviceRegistry": {
        "type": "string",
        "attributes": {
            # key-value map
            "string": "string",
            "string": "string"
        }
    }
}
$ service_mesh register-service --cli-input-j =son "${json}"
```

Figure 3:
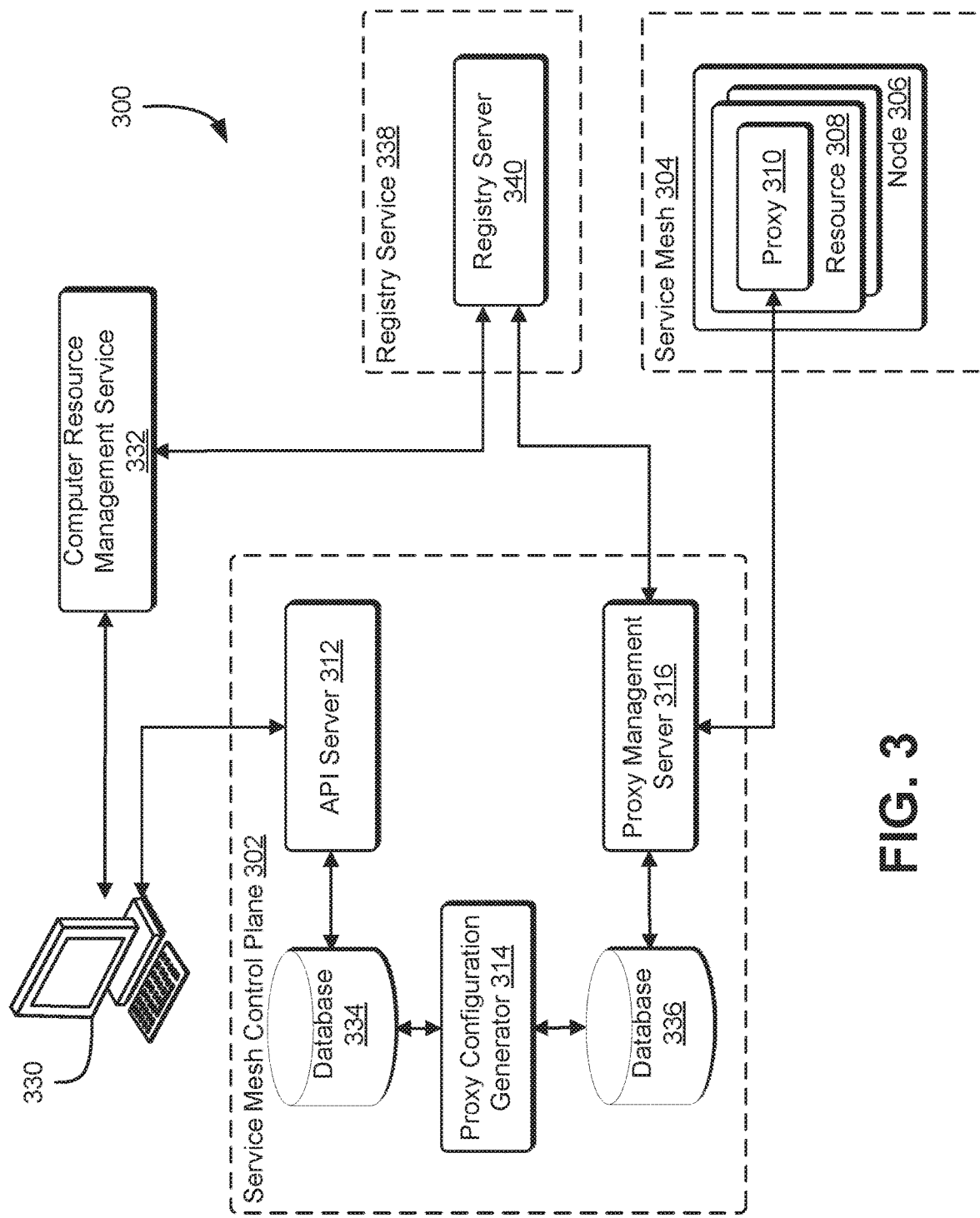
FIG. 3 shows an illustrative example of an architectural diagram of a service mesh control plane in accordance with at least one embodiment.

FIG. 3 shows an illustrative example of an architectural diagram 300 of a service mesh control plane 302 in accordance with at least one embodiment. Service mesh control plane 302 may be service mesh control plane 102 of FIG. 1 in accordance with an embodiment. Service mesh 304 may be service mesh 104 of FIG. 1 in accordance with an embodiment. Nodes 306 may be one of nodes 106A-C of FIG. 1 in accordance with an embodiment. API server 312 may be API server 112 of FIG. 1 in accordance with an embodiment. Proxy configuration generator 314 may be proxy configuration generator 114 of FIG. 1 in accordance with an embodiment. Proxy management server 316 may be proxy management server 116 of FIG. 1 in accordance with an embodiment.

In several embodiments, the customer 330 may be an individual associated with a customer account of the computer resource management service 332, or may be an individual, system, resource, computing device, or other entity authorized to act on behalf of the individual associated with the customer account. Furthermore, the resources of the customer 330 may be made available to other users. For example, the customer 330 may utilize the resources 308 in the service mesh 304 to provide an online marketplace for other users, and these other users may then buy and/or sell goods and services through the online marketplace provided by the customer 330. The customer 330 may communicate with the service mesh 304 of the computing resource service provider through the network, which may be a communication network, such as the Internet, an intranet, an internet service provider (ISP) network and/or some other such network.

In several embodiments, the service mesh control plane 302 may include database 334 and database 336 with which different components, such as API server 312, proxy configuration generator 314, and proxy management server 316 may interact. For example, the API server 312 may obtain routing information from customer 330 and store the information in database 334. In another example, interface data such as APIs and libraries can be stored in database 334 from which the API server 312 may reference when responding to requests from customer 330. From database 334, relevant data (e.g., routing information of node 306) may be retrieved by the proxy configuration generator 314, which in turn stores such data into database 336. In several embodiments, the proxy management server 316 may reference the database 336 to interact with node 306 of service mesh 304.

In several embodiments, service mesh control plane 302 may interact with one or more computing resource 308 services to manage the operations being performed by the nodes (e.g., node 306) in the service mesh 304. For example, service mesh control plane 102 may communicate with a registry service 338, which provides the list of endpoints associated with nodes existing in the service mesh 304. In some embodiments, the proxy management server 316 may obtain endpoint information (e.g., IP address, network namespaces) from the registry server 340 to establish communication channels between the nodes 106A-C in the service mesh 304.

In several embodiments, the registry server 340 may be a comprised of one or more repositories configured to store files and/or directories corresponding to container images, such as the node 306, and metadata for the files and/or directories. Registry server 340 of the registry service 338 may communicate with service mesh control plane 302 with varying security policies. The repositories may be individual databases or may be stored in one or more data stores of a data storage service of the computing resource service provider, such as data store 9910 of FIG. 9. Each repository may have various associated roles and policies specifying access types and restricting access to the repository to entities authorized by the customer to access the repository.

In several implementations, the service mesh control plane 302 may interact with services outside of the service mesh 304. For example, service mesh control plane 302 may communicate with a third party service that provides a circuit breaker service, which may cut the normal routing path of nodes 306 when its network performance exceeds a threshold, error rate exceeds a threshold, and/or resource consumption exceeds a threshold. In some embodiments, instead of terminating the entire node 306 when the circuit is interrupted a software circuit breaker can fallback to another routing path initially specified by the intent (e.g., intent 220 of FIG. 2) of the node 306 that may support the node 306. After a certain period of time, the software circuit breaker mechanism may generate few requests down the normal routing path to determine whether the network traffic can switch back.

In some implementations, distributed circuit breaking may be effective in controlling throughput in distributed systems, though global rate limiting can be used as an alternative or in conjunction with circuit breakers. For example, consider a large number of container instances are forwarding traffic to a smaller number of container instances and the average request latency is low (e.g., connections/requests to a database microservice). In effect, the target container instances may become overburdened. In such cases, the downstream instances will overwhelm the upstream cluster. In this example, it is difficult to configure a tight enough circuit breaking limit on each downstream container instance such that the system will operate normally during typical request patterns but still prevent cascading failure when the system starts to fail. In such cases, proxy configuration generator 114 may apply with global rate limiting service that includes: (1) network level rate limit filter service, which limits the connections per second that transit the listener; and (2) HTTP level rate limit filter in which all requests to the target upstream cluster as well as all requests from the originating cluster to the target cluster can be rate limited.

In several implementations, service mesh control plane 302 may interact with a computing resource management service 332 that may configure the operations of nodes (e.g., nodes 206B-E of FIG. 2) and corresponding resources. In one embodiment, nodes may be selected for retry attempts if the initial request fails to reach the intended node. In one embodiment, node 306 may transmit, to the proxy management server 316, its intent that includes network configurations for retry attempts at which the proxy management server 316 forwards the collected information to the computing management service. In some implementations, the computing resource management service may modify the retry behavior including "rejecting" a node to cause node selection to be reattempted. If one or more predicates have been configured, container selection will continue until a configurable max attempts has been reached. Any number of these predicates can be specified, and the node will be rejected if any of the predicates reject the host. In other embodiments, the computing resource management service may adjust the priority level when selecting a node for a retry attempt. In some embodiments, container selection and priority adjustment mechanisms can be combined.

In some embodiments, service mesh control plane 302 may interact with data security service that my collect the network traffic data provided by the nodes (nodes 206A-E of FIG. 2) and generates a log of such collected network traffic data. Based on the log of traffic data, the data security service may detect any deviation from the log by continues tracking the network traffic data of the nodes in the service mesh. In the event that deviation of the network traffic data exceeds a threshold, the data security service may determine that the one or more nodes in the service mesh may have been compromised by unauthorized access or other malicious attacks. As illustrated above, the ability for the nodes to communicate network data to data security services may improve the security of the service mesh and detect any harmful intrusion that may be occurring in the service mesh 304.

Figure 4:
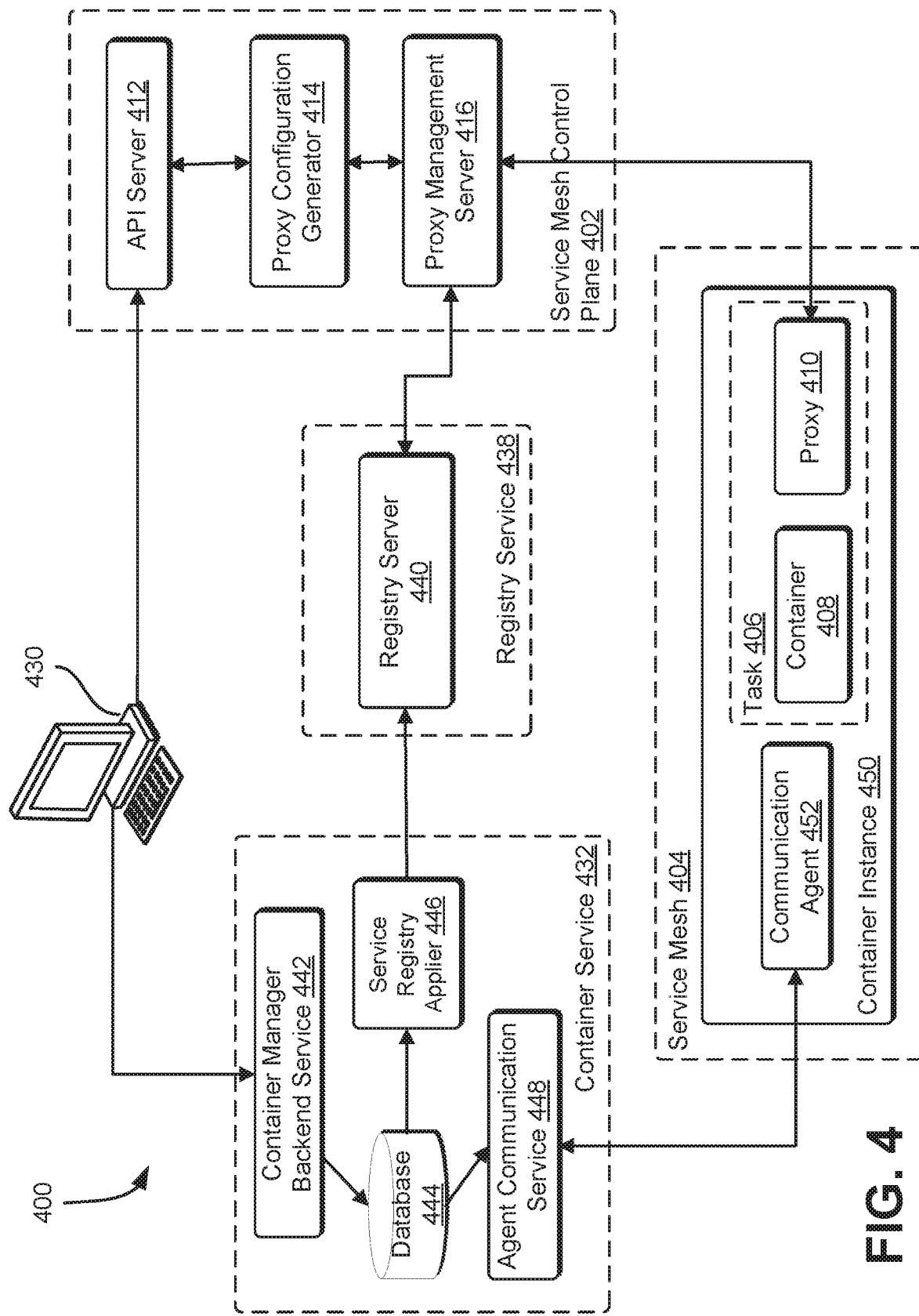
FIG. 4 shows an illustrative example of an environment in which a software container management service with a first software architecture interacts with the service mesh in accordance with at least one embodiment.

FIG. 4 shows an illustrative example of an environment 400 in which a software container management service with a first software architecture interacts with the service mesh in accordance with at least one embodiment. Service mesh control plane 402 may be service mesh control plane 302 of FIG. 3 in accordance with an embodiment. Service mesh 404 may be service mesh 304 of FIG. 3 in accordance with an embodiment. Nodes may be node 306 of FIG. 3 in accordance with an embodiment. API server 412 may be API server 312 of FIG. 3 in accordance with an embodiment. Proxy configuration generator 414 may be proxy configuration generator 314 of FIG. 3 in accordance with an embodiment. Proxy management server 416 may be proxy management server 316 of FIG. 3 in accordance with an embodiment. Registry service 438 may be registry service 338 of FIG. 3 in accordance with an embodiment. Registry server 440 may be registry server 340 of FIG. 3 in accordance with an embodiment. Container service 432 may be computer resource management service 332 of FIG. 3 in accordance with an embodiments.

In several embodiments, container service 432 may interact with container 408 and service mesh control plane 402 to allow the customer 430 to manage operational aspects of the containers while tracing network traffic and capturing the dependency relationships of the microservice being run on one or more container instances. In one embodiment, container service 432 includes a subset of services including container manager backend service 442, database service 444, service registry applier 446, and agent communication service 448.

In an embodiment, the container instance 450 includes communication agent 452 that communicate with an agent communication service 448 of the container service 432. The agent communication service 448 may track the status of all agents in a cluster, and may push run commands and state changes to its respective instance. In some embodiments, other components of the container service 432 may communicate with container 408 and the container instance 450 is performed through the agent communication service 448. The agent communication service 448 may transmit state change information for container 408 and may append a sequence of state changes for containers of the cluster to incorporate the newly obtained state change information. The state change information may specify state transitions for a container 408. For instance, the container agent of the container instance may record, as state change information, a state transition for a container from an idle state to a processing state in response to execution of a task 406.

In several implementations, the container service 432 may utilize the service registry applier 446 to pull identification and configuration data of any container instances (including container instance 450) and publish such identification and configuration data on the registry service 438 of the service mesh control plane 402. In some embodiments, the container service 432 provides the information about the container 408 as the microservice is being executed in the container instance 450.

Figure 5:
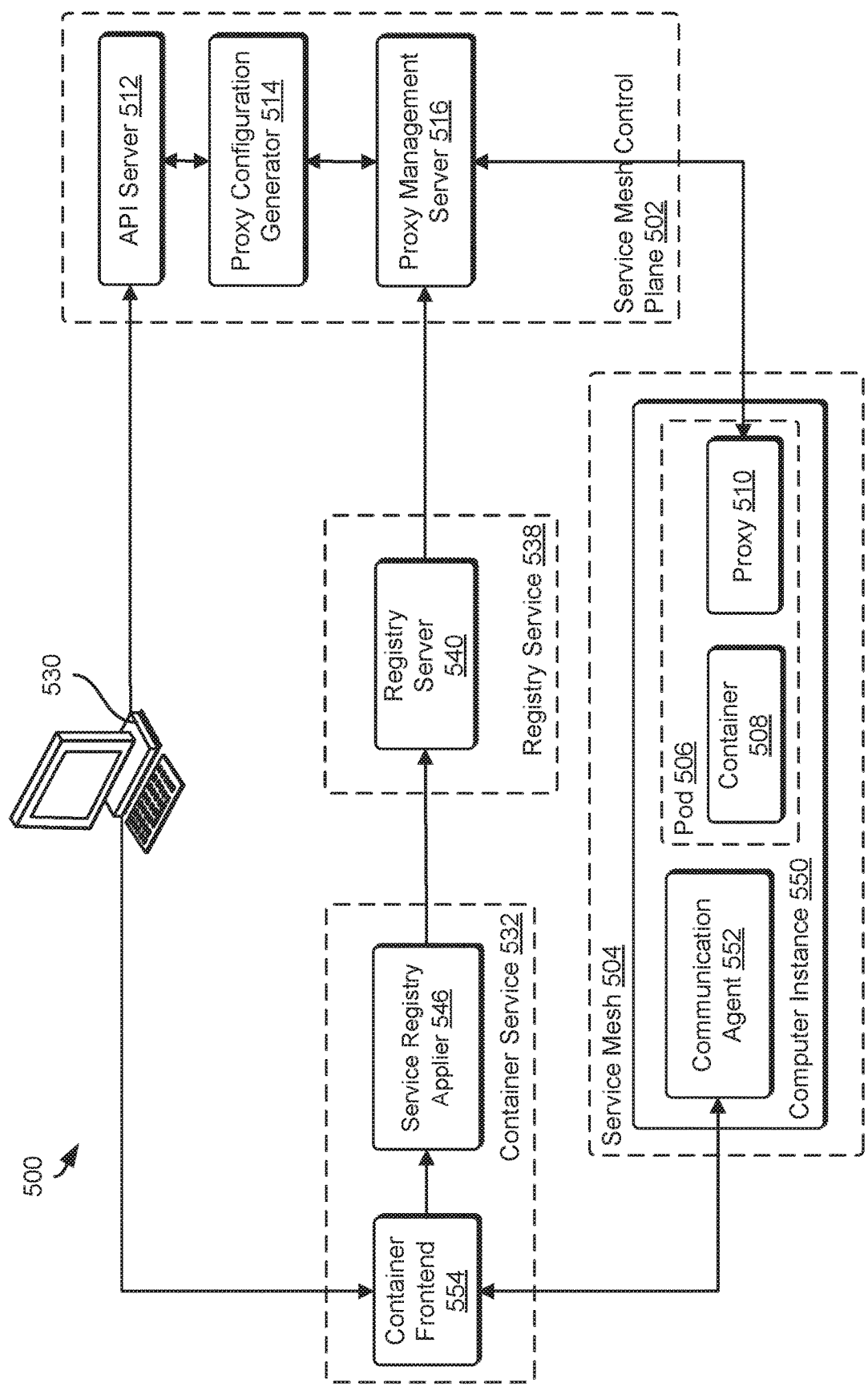
FIG. 5 shows an illustrative example of an environment in which a software container management service with a second software architecture interacts with the service mesh in accordance with at least one embodiment in accordance with at least one embodiment.

FIG. 5 shows an illustrative example of an environment 500 in which a software container management service with a second software architecture interacts with the service mesh in accordance with at least one embodiment in accordance with at least one embodiment. Service mesh control plane 502 may be service mesh control plane 302 of FIG. 3 in accordance with an embodiment. Service mesh 504 may be service mesh 304 of FIG. 3 in accordance with an embodiment. Pod 506 may be node 306 of FIG. 3 in accordance with an embodiment. API server 512 may be API server 312 of FIG. 3 in accordance with an embodiment. Proxy configuration generator 514 may be proxy configuration generator 314 of FIG. 3 in accordance with an embodiment. Proxy management server 516 may be proxy management server 316 of FIG. 3 in accordance with an embodiment. Registry service 538 may be registry service 338 of FIG. 3 in accordance with an embodiment. Registry server 540 may be registry server 340 of FIG. 3 in accordance with an embodiment. Container service 532 may be computer resource management service 332 of FIG. 3 in accordance with an embodiments.

In several embodiments, container service 532, which includes a different architecture from other container services (e.g., container service 432) may interact with node and service mesh control plane 402 to allow the customer 530 to manage operational aspects of the containers while tracing network traffic and capturing the dependency relationships of the microservice being run on one or more nodes in the service mesh 404. In one embodiment, container service 532 includes a subset of services such as a container frontend 554 and service registry applier 546. In one embodiment, the container frontend 554 interacts with communication agent 552 to configure the resources available in pod 506 and manage the operations of the resources associated with the pod 506, including container 508.

In several implementations, the container service 532 may utilized the service registry applier 546 that periodically polls the container frontend 554 to retrieve identification and configuration data of pods and publish such identification and configuration data on the registry service 538 of the service mesh control plane 402. In this embodiment, the identification and configuration data of the pods, such as pod 506, are polled periodically and provided to the registry server 540 regardless of whether the pods are being executed. As shown in FIG. 4 and FIG. 5, the service mesh control plane is constructed in a manner that allows different types of container services to communicate regardless of their architecture or code systems used to build the containers.

FIGS. 6-9 show illustrative processes executed to generate and manage a service mesh in accordance with the embodiments. The processes are illustrated as a collection of blocks in a logical flow graph, which represents a number of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 6:
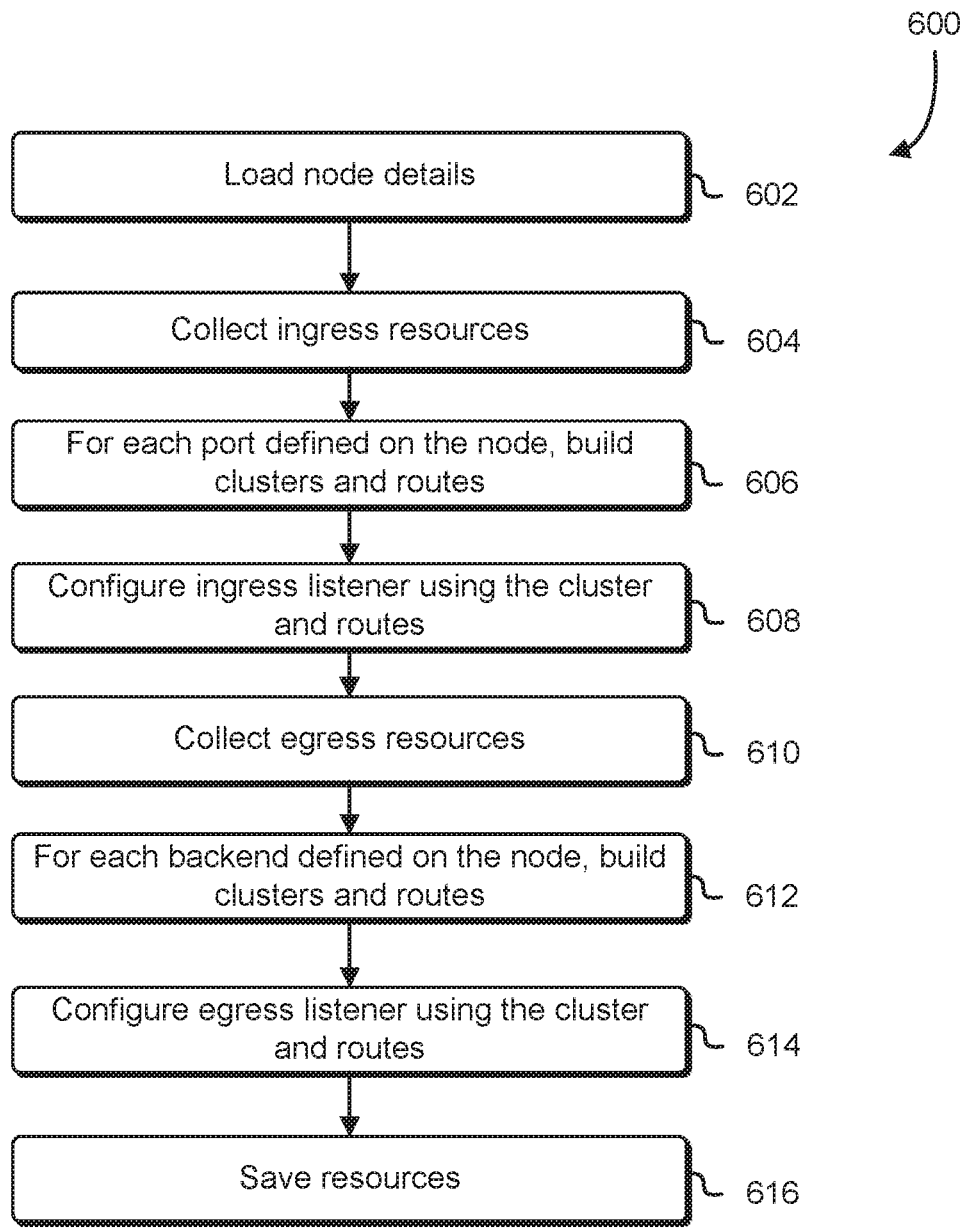
FIG. 6 shows an illustrative example of a process in which network resources of nodes in a service mesh are configured in accordance with at least one embodiment.

FIG. 6 shows an illustrative example of a process 600 in which network resources of nodes in a service mesh are configured by a proxy configuration generator in accordance with at least one embodiment. Process 600 initiated by step 602, in which the proxy configuration generator (such as proxy configuration generator 114 of FIG. 1) loading details associated with the node (such as node 106A of FIG. 1). In some embodiments, the node provides its associated its details through its intent (such as intent 120 of FIG. 1), which enables the proxy configuration generator to configure the network information on node-by-node basis. At step 604, the proxy configuration generator collects the ingress resources. In several embodiments, ingress resources may include network information associated with the nodes in the service mesh, such as endpoints of computation resources, storage resources, servers, host systems, etc., that can be used to manage all the data communications and network traffic originating from external networks and destined for a node in the service mesh.

At step 606, the proxy configuration generator, based on the ingress resources, builds clusters and routes for each port defined in the node in the service mesh. For example, the proxy configuration generator may designate port 80 for the ingress listener for the node and specify a network address to which external source (e.g., customer, monitoring service) can access the node. In several embodiments, the clusters and routes of a port in a first node in the service mesh (e.g., node 106A) are different from those in the other nodes in the service mesh (e.g., node 106B-C). Thereafter, the proxy configuration generator may configure ingress listener of the node using the cluster and routes (step 608).

At step 610, the proxy configuration generator collects the egress resources. In several embodiments, egress resources may include network information associated with the nodes in the service mesh, such as endpoints of computation resources, storage resources, servers, host systems, etc., that can be used to manage all the data communications and network traffic from the nodes in the service mesh and bound to the external networks. At step 612, the proxy configuration generator, based on the egress resources, builds clusters and routes for each backend defined in the node in the service mesh. For example, the proxy configuration generator may designate port 8080 for the egress listener for outbound traffic of the node and specify a backend address that routes network traffic to any edge routers of the service mesh that forwards such traffic to external sources (e.g., customer, monitoring service). In some embodiments, the cluster and routes of the ingress ports are different from the egress backends of the node. In this manner, the service mesh control plane may further manage the network packets that are routed into and out of each node in the service mesh. Thereafter, the proxy configuration generator, based on the cluster and routes of the node backend, may configure the egress listener associated the node (step 614). Once the ingress and egress listeners are configured, the proxy configuration generator saves the resources (step 616), such as database 336 of FIG. 3. Process 600 terminates thereafter.

Figure 7:
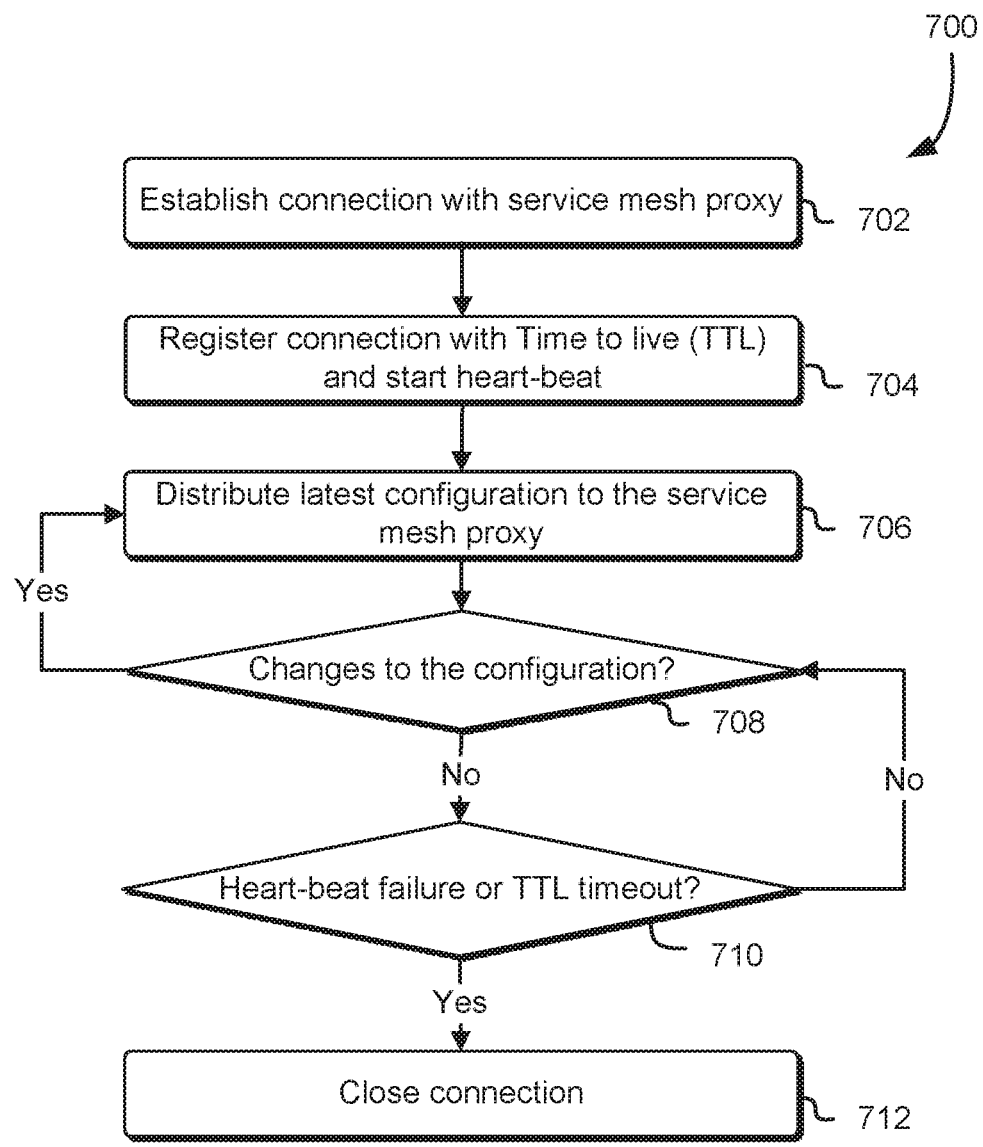
FIG. 7 shows an illustrative example of a process in which the proxy management server distributes configuration information to nodes in a service mesh in accordance with at least one embodiment.

FIG. 7 shows an illustrative example of a process 700 in which the proxy management server distributes configuration information to nodes in a service mesh in accordance with at least one embodiment. Process 700 is initiated by the proxy management server (e.g., proxy management server 116 of FIG. 1) establishing connection with the service mesh proxy, step 702 (e.g., proxy 110A of FIG. 1). In several embodiments, the proxy management server and a node may be interconnected via communication links (e.g., transmission control protocol (TCP) connections and/or transport layer security (TLS) or other cryptographically protected communication sessions), using one or more computer networks or direct connections. In another embodiment, the connection between the proxy management server and the node may be established via a private communications channel or via a dedicated communications link to secure the packets being transmitted within the service mesh.

At step 704, the proxy management server registers connection with time to live (TTL) and initiates heartbeat for the connection. In several embodiments, TTL refers to a mechanism used to limit the lifespan of data over a network, in which TTL specifies a number of hops that a packet can travel before being discarded by a router. In one embodiment, specific TTL numbers indicate the maximum range for packets. In one embodiment, heartbeat refers to messages that is generated at predetermined time intervals then transmitted between the proxy management server and node, in which the connection is aborted when number of heartbeats reach the TTL limit or heartbeat messages fail to reach the intended endpoints. After the connection is configured, the proxy management server distributes latest configuration data to the service mesh proxy (step 706). In one embodiment, the proxy management server obtains the latest configuration data from a database in the service mesh control plane to which the proxy configuration generator pushes the configuration data into such database.

The proxy management server then determines whether there are any changes to the configuration data (step 708). If so ("Yes" path of step 708), the proxy management server repeats the distribution of the updated configuration data to the node (step 706). In the event there are no changes to the configuration ("No" path of step 708), the proxy management server determines whether there is a heart-beat failure or TTL timeout associated with the connection (step 710). The proxy management server continues the process of detecting changes to the configuration and distributing updated configuration data to the node if the connection is still healthy ("No" path of step 710). In the event that the heartbeat messages fail to reach the intended destination or TTL is expired ("Yes" path of step 710), the proxy management servers closes the connection (step 712). Process 712 terminates thereafter.

Figure 8:
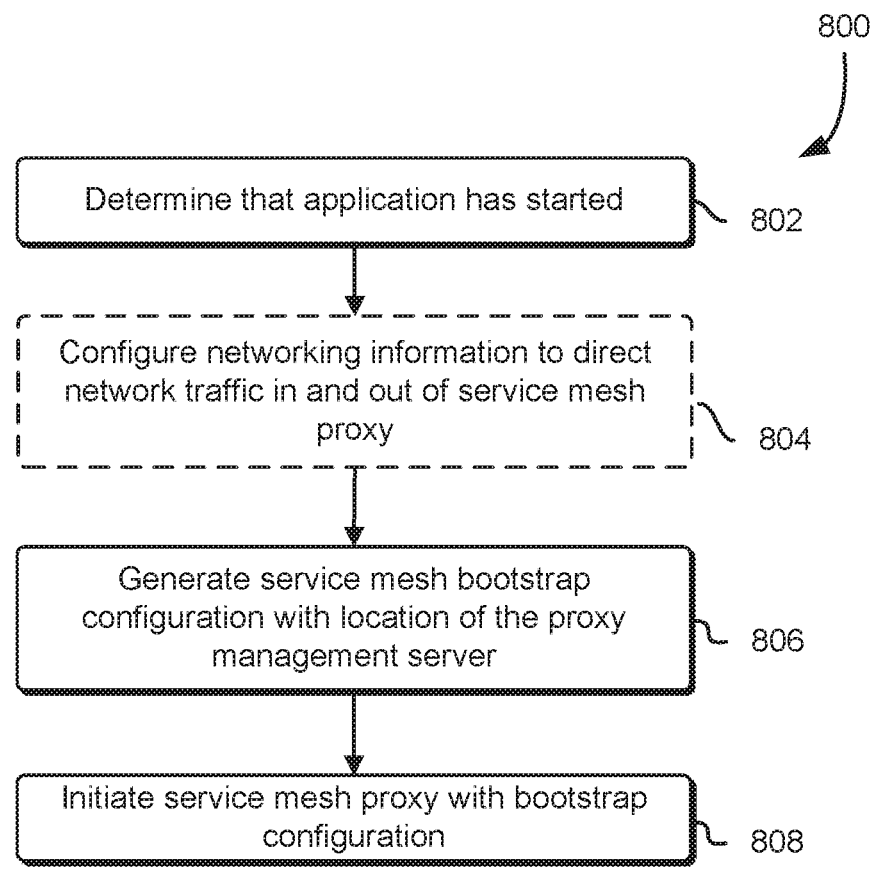
FIG. 8 shows an illustrative example of a process in which a proxy of a node is registered with the service mesh in accordance with at least one embodiment.

FIG. 8 shows an illustrative example of a process 800 in which a proxy of a node is registered with the service mesh in accordance with at least one embodiment. At step 802, proxy (e.g., proxy 110A of FIG. 1) determines that the application has started. As an optional step 804, the proxy configures networking information to direct network traffic in and out of the proxy. In some embodiments, optional step 804 is not configured by the proxy but rather managed by the process 600 of FIG. 6 that is performed by proxy configuration generator. In one embodiment, the configuration of the networking information for the proxy is provided by the node definition.

At step 806, the proxy generates service mesh boostrap configuration with the location of the proxy management server. In several embodiments, bootstrap configuration of the proxy includes loading a set of instructions when a proxy is first initiated. During the startup process of the proxy, diagnostic tests may be performed, such as the power-on self-test (POST), that set or check configurations and implement routine testing for the connection to other components of the service mesh, including connection to the proxy management server. In some embodiments, the proxy may utilize a bootstrap protocol (BOOTP) during start-up, in order to obtain a network address of the proxy management server. In one embodiment, the bootstrap configuration may include obtaining feedback identifier generated by the service mesh control plane the node is generated. In some embodiments, the feedback identifier may be included in the node definition.

Once the bootstrap configuration is completed, at step 808, the proxy initiates operations with the bootstrap configuration. Process 800 terminates thereafter.

Figure 9:
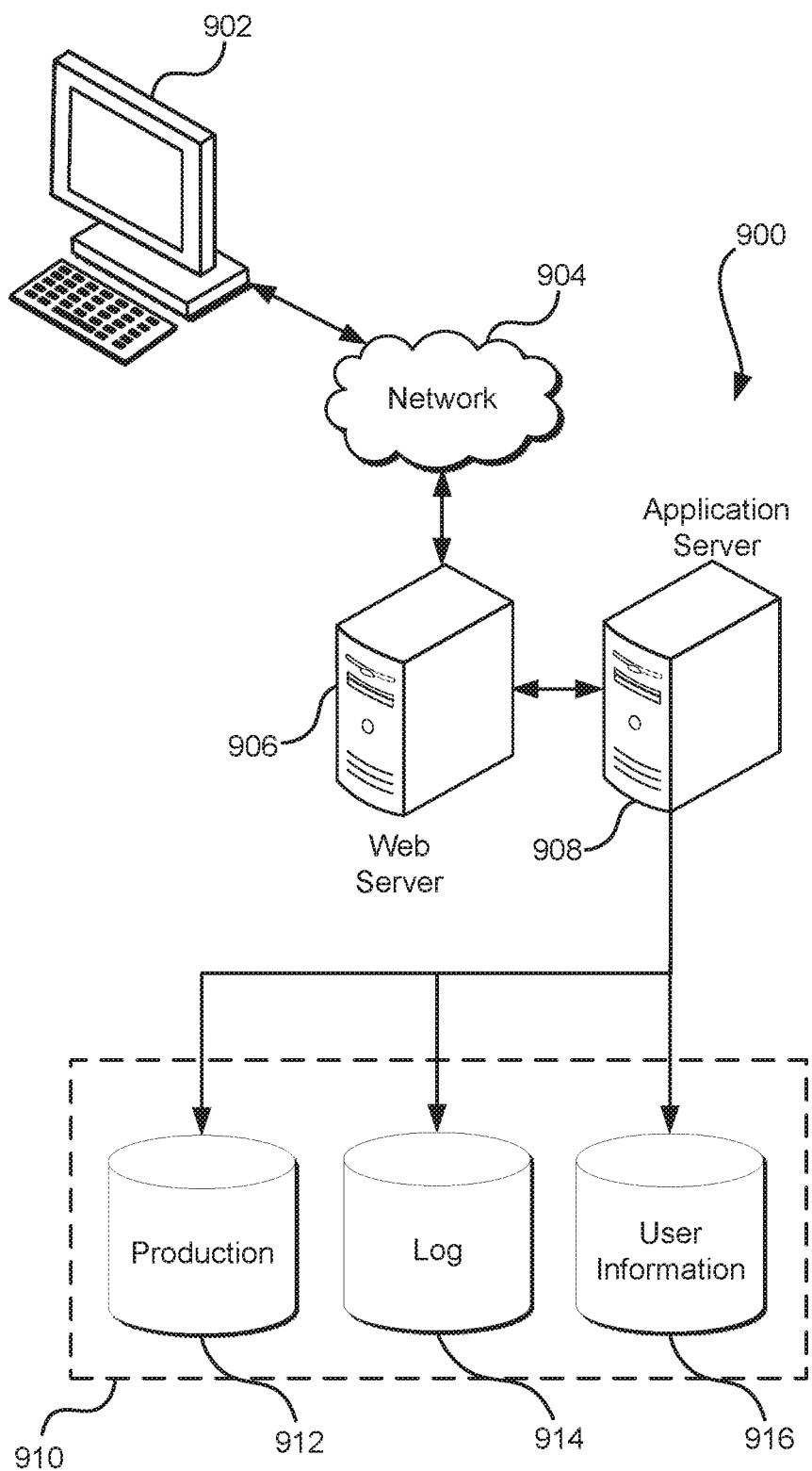
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM as well as open-source servers such as My SQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above, which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   a service mesh, the service mesh comprising a plurality of nodes, an individual node of the plurality of nodes including a resource component and a proxy component to transmit a set of constraints associated with connections permitted to be established with other nodes of the service mesh via a port and network address of respective proxy components of the plurality of nodes as indicated b the set of constraints; and
   a control plane that:
      obtains the set of constraints transmitted by the proxy component, the set of constraints indicating a network configuration for network communication associated with the individual node establishes connections among the plurality of nodes associated with the service mesh in accordance with the sets of constraints provided by the individual node, the connections being restricted to occur, between proxy components associated with the plurality of nodes, in accordance with the set of constraints; and obtains, from one or more of the proxy components associated with the plurality of nodes, network traffic data generated by the plurality of nodes.

2. The system of claim 1, wherein the set of constraints further indicate a constraint that causes communications to be routed to a port and network address of the proxy components.

3. The system of claim 1, wherein the set of constraints further indicate a maximum number of connection requests that can be received by the plurality of nodes.

4. The system of claim 1, wherein the service mesh further comprises a virtual router to direct connection requests between the plurality of nodes in accordance with the set of constraints.

5. The system of claim 1, wherein:
the system further comprises a monitoring service; and
the control plane of the service mesh provides the network traffic data of the plurality of nodes to the monitoring service.

6. The system of claim 5, wherein the monitoring service identifies, based at least on the network traffic data, at least one node of the plurality of nodes that causes network failure of the service mesh.

7. A computer-implemented method, comprising:
generating a service mesh that includes a plurality of computing resources;
instantiating a computing resource;
obtaining, from the computing resource, a request to associate the computing resource with another computing resource in the service mesh, the request comprising a set of constraints that allows the another computing resource to be identified and identify connections permitted to be established in the service mesh via a network address of respective proxy components of the plurality of computing resources as indicated by the set of constraints;
identifying, based at least in part on the set of constraints, the another computing resource;
providing, to the computing resource, an identifier to configure a proxy component of the computing resource; and
in response to the proxy component being configured for the computing resource, causing the proxy component of the computing resource to establish, in accordance with the set of constraints, network communication with another proxy component of the another computing resource.

8. The computer-implemented method of claim 7, wherein providing the identifier verifies to the computing resource that the request has been processed by, a control plane of the service mesh.

9. The computer-implemented method of claim 7, wherein the set of constraints indicates information to identify a location of the another computing resource.

10. The computer-implemented method of claim 9, wherein the information to identify the location of the another computing resource is a domain name.

11. A non-transitory computer-readable storage medium having stored thereon executable instructions that, as a result of being executed by one or more processors of a computer system, cause the computer system to at least:
establish a connection with a first computing resource of a plurality of computing resources in a service mesh via an address of a proxy of the first computing resource as indicated by a set of one or more constraints;
obtain, from the proxy of the first computing resource, a request to permit the first computing resource to communicate with a second computing resource of the plurality of computing resources, the request indicating communication to be restricted to the first computing resource and second computing resource;
cause the proxy of the first computing resource to communicate with a proxy of the second computing resource;
in response to processing the request, update proxy configuration data associated with the plurality of computing resources of the service mesh, wherein proxy configuration data associated with the first computing resource is different from proxy configuration data of other computing resources of the plurality of computing resources; and
distribute the proxy configuration data to the plurality of computing resources.

12. The non-transitory computer-readable storage medium of claim 11, wherein the request further includes information indicative of network characteristics of the second computing resource.

13. The non-transitory computer-readable storage medium of claim 12, wherein the instructions further comprise instructions that, as a result of being executed by the one or more processors, cause the computer system to determine the second computing resource based on the network characteristics.

14. The non-transitory computer-readable storage medium of claim 11, wherein information specified in the request from the first computing resource is inaccessible by the another computing resources of the plurality of computing resources.

15. The non-transitory computer-readable storage medium of claim 11, wherein the instructions further comprise instructions that, as a result of being executed by the one or more processors, cause the computer system to:
generate routing information for a network port associated with the first computing resource; and
configure an ingress listener for the first computing resource based at least in part on the routing information.

16. The non-transitory computer-readable storage medium of claim 11, wherein the instructions further comprise instructions that, as a result of being executed by the one or more processors, cause the computer system to:
generate routing information for a network port associated with the first computing resource; and
configure an egress listener for the first computing resource based at least in part on the routing information.

17. The non-transitory computer-readable storage medium of claim 11, wherein the instructions further comprise instructions that, as a result of being executed by the one or more processors, cause the computer system to replace a security policy of the first computing resource, the security policy of the first computing resource different from one or more security policies of the another computing resources of the service mesh, the security policy identifying a second plurality of computing resources within the plurality of computing resources, the second plurality of computing resources associated with a customer.

18. The non-transitory computer-readable storage medium of claim 11, wherein the first computing resource is configured to be constructed using a first coding system and the second computing resource is configured to be constructed using a second coding system.

19. The non-transitory computer-readable storage medium of claim 12, wherein the first computing resource is configured to be registered with the service mesh based at least in part on bootstrap configuration indicating a network address of a proxy management server of the service mesh.

20. The non-transitory computer-readable storage medium of claim 11, wherein the instructions further comprise instructions that, as a result of being executed by the one or more processors, cause the computer system to interact with a registry service that provides network addresses of the plurality of computing resources of the service mesh.

* * * * *